UNITED STATES PATENT OFFICE.

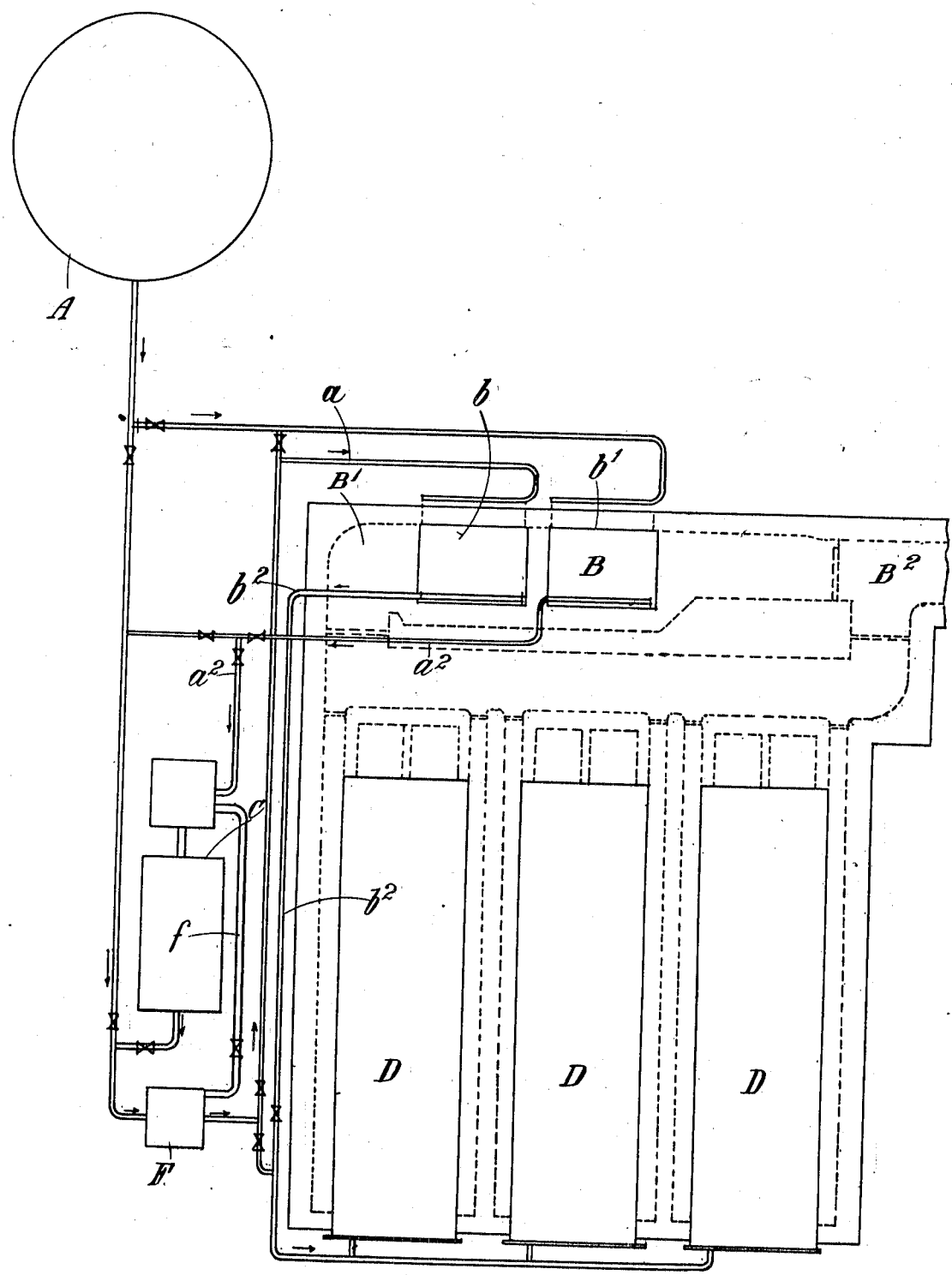

CHARLES ERITH, OF LONDON, ENGLAND.

PROCESS FOR HEATING AND PURIFYING OR SOFTENING WATER.

1,099,433.  Specification of Letters Patent.  Patented June 9, 1914.

Application filed March 20, 1911. Serial No. 615,476.

*To all whom it may concern:*

Be it known that I, CHARLES ERITH, a subject of the King of Great Britain, residing at 70 Gracechurch street, in the city and county of London, England, have invented a certain new and useful Process for Heating and Purifying or Softening Water, of which the following is a specification.

This invention relates to the heating and purifying or softening of water for industrial purposes, such for instance as steam plants for which hot soft water is required and for other purposes; the object being to effect the desired treatment in the most economical manner by utilizing the heat of waste gases.

The invention is particularly applicable for employment with apparatus of the character described in the specification of British Letters Patent granted to me No. 6,946 of 1904, in which a combined chemical and mechanical purification is obtained by heating the water with steam to about 210° Fahr. while subjecting the same to the action of a single re-agent, usually carbonate of soda, in a vessel vented to the atmosphere. Although exhaust or waste steam is suitable for this purpose it often happens that sufficient exhaust steam is not available for the complete heating of the feed water, so that part of the heating has to be effected by live steam because in the event of the water being not sufficiently heated to effect the above-mentioned mechanical and chemical purification with a single re-agent, such as carbonate of soda, it would become necessary to use a further re-agent such as lime, to obtain the desired purification and softening of the feed water.

In order to overcome the aforesaid objection, an expedient, previously proposed in connection with the softening and purifying of feed water, is adopted the water being heated in an "economizer" during treatment. In these earlier methods of treatment, however, the necessary re-agent or chemical precipitant is mixed with the feed water and the mixture heated in the "economizer" so that the softening takes place in the latter under pressure. The mixture is then passed through a separator and so on alternately through a section or portion of the "economizer" and through a separator until the water is sufficiently purified. This method of treating the feed water is objectionable as a considerable proportion of the impurities are deposited on the economizer tubes as scale and consequently have to be removed periodically by boring or other similar operations.

According to this invention the aforesaid objection is avoided by purifying and softening the water in a vessel vented to the atmosphere and the steam heating required is minimized by heating the water prior to its admission thereto, by waste gases from boilers or furnaces, to a temperature only slightly below that needed for the desired mechanical and chemical purification of the water. The additional heat required to bring the water to the required temperature is small, and is consequently supplied by a minimum quantity of exhaust or waste steam. The preliminary and final heating is obtained by means of an "economizer" which may comprise a series of rows of pipes, placed in the path of the waste gases from the boilers or furnaces, and which is usually built in two or more sections through which the water is passed.

In order that the invention may be clearly understood and readily carried into effect, I will proceed to describe the same with reference to the accompanying drawing in which I have illustrated diagrammatically the application of the invention to a steam generating plant.

The tank A contains a supply of the feed water to be treated.

B is an "economizer" placed in the main flue B'; C is a heating and softening apparatus of the character described in my aforesaid prior patent, and D D represent a battery of boilers. The economizer B usually comprises two or more groups or sections of pipes, of which, the group nearest to the end of the economizer at which the waste gases enter, receives the most heat, the temperature of the gases falling as they pass on their way to the chimney flue $B^2$. Each successive row of pipes receives less heat and the water is heated to a corresponding degree in each row. When hard water is pumped through the economizer the precipitation of scale and sludge forming solids occurs in the rows of pipes which receive the most heat, and in order to prevent the formation of scale it is necessary to soften or purify the water passing through these rows. In the arrangement shown, two groups of pipes $b$, $b'$ are provided in the economizer and the hard feed water is first conducted through the group $b'$. The water leaving this group not being sufficiently hot for the formation of scale in closed pipes, heat is absorbed thereby from the gases which traverse this group of pipes without the formation of scale. The water before being passed through the group of pipes $b$ is, however, purified in the apparatus C and although its temperature is sufficient for the formation of scale, none will be formed as the impurities in the water have been removed, owing to its treatment in the heating and softening apparatus C.

In the normal working of the plant the hard water passes from the tank A, through the pipe $a$ to the part $b'$ of the "economizer" through the pipes of which it circulates and from thence it passes by way of the pipe $a^2$ to the steam heating and softening apparatus C. From this apparatus the hot purified water is pumped by the feed pump F through the second group of pipes $b$ of the economizer to the boilers D by way of the pipe $b^2$. Suitable connections and valves are provided whereby the purifying and softening apparatus C and "economizer" B may be disconnected for cleaning without shutting down the boilers D. Owing to the heating and softening of the water which is effected between the passage of the water through the successive groups $b'$, $b$ of the "economizer," scale formation is effectively avoided. The flow of the water through respective sections of the "economizer" in the manner described enables a greater amount of heat to be recovered from the waste gases than would be the case if softened water at about 210° Fahr. was pumped directly from the purifying apparatus through the entire "economizer," as the transfer of heat is proportional to the difference in temperature between the gases and the water.

By preheating the hard or unpurified water by hot waste gases in the "economizer," most of the steam otherwise required for the purifying and softening apparatus is saved. The hard water flowing through the group of pipes $b'$ of the economizer enters the purifying apparatus C at a temperature of about 180° Fahr. and is there mixed with a proportionate quantity of soda solution, the water being further heated by flowing over a series of trays arranged in cascade in a steam bath supplied from the exhaust steam from the pump F by way of the pipe $f$, whereby the chemical and mechanical purification referred to in my aforesaid prior patent is effected.

When the water entering the apparatus C has been heated by the waste gases to a temperature of about 180° F. as described, very little steam is required to effect the heating of the water to a temperature of 210° F. which is the temperature necessary for obtaining the desired purification.

The exhaust steam from the feed pump F usually suffices, but, if necessary additional exhaust or live steam can be employed. The flow of water through the group of economizer pipes $b'$ is controlled by a float or the like (not shown) in the apparatus C, and this float also serves to control the admission into the apparatus of the necessary re-agent, the float admitting water to correspond with the demand of the pump.

The final heating of the feed water is effected in the group $b$ of the economizer, by the waste gases in the usual manner and the purified water enters the boilers at a temperature of about 250° to 300° Fahr. the economizer and boilers being kept free from scale by the efficient application of the aforesaid process of purification.

Although I have referred to certain temperatures at the various stages of the treatment it will be readily understood that these will be liable to variation within certain limits for different uses of the invention.

What I claim and desire to secure by Letters Patent of the United States is:—

1. The method of heating and purifying feed water, which consists in preliminarily heating the water in an economizer by hot waste gases from the boiler furnace to a temperature below that at which substantial deposition of impurities occurs, transferring the water to a suitable purifier and there adding an appropriate chemical reagent to effect purification thereof, and finally returning the water to the economizer and there heating it to the feed temperature, whereby deposition of impurities in the economizer is avoided; substantially as described.

2. The method of utilizing the heat of waste furnace gases in the heating and purification of feed water, which consists in transferring the heat of the gases to the water in an economizer until the temperature of the water approximates that at which the contained impurities would be deposited, removing the water from the economizer and effecting the deposition of the impurities, and finally returning the purified water to the economizer and raising it to the feed temperature by the heat of the waste gases; substantially as described.

3. The method of utilizing the heat of waste furnace gases in the heating and purification of feed water, which consists in transferring the heat of the gases to the water in an economizer until the temperature of the water approximates that at which the contained impurities would be deposited, removing the water from the economizer and effecting the deposition of the impurities with the aid of steam heat transferred thereto, and finally returning the purified water to the economizer and raising it to the feed temperature by the heat of the waste gases; substantially as described.

4. The method of heating and purifying feed water with the aid of waste furnace gases, which consists in transferring the heat of the gases to the water in an economizer until the temperature of the water approximates that suitable for chemical purification by a single reagent, transferring the water to a suitable purifier, there adding to the water an appropriate reagent and steam heat to remove the scale-forming impurities, and finally returning the purified water to the economizer and there bringing it to the feed temperature by the heat of the waste furnace gases; substantially as described.

5. The method of operating an economizer heated by waste furnace gases in the heating and purification of feed water, which consists in passing the water through the economizer at temperatures below that at which deposition of contained impurities takes place, removing the water from the economizer and passing it through the temperature of deposition by the addition of steam heat; substantially as described.

6. The method of operating an economizer heated by waste furnace gases in the heating and purification of feed water, which consists in passing the water through the economizer at temperatures below that at which deposition of contained impurities takes place, removing the water from the economizer, passing it through the temperature of deposition by the addition of steam heat, and finally returning the purified water to the economizer and there heating it to the feed temperature; substantially as described.

In testimony whereof I affix my signature in presence of two witnesses.

CHARLES ERITH.

Witnesses:
W. J. SKERTEN,
GEO. M. FRANKLIN.